US010766416B2

(12) United States Patent
Yoshihara et al.

(10) Patent No.: US 10,766,416 B2
(45) Date of Patent: Sep. 8, 2020

(54) ALARM SYSTEM FOR VEHICLE (71) Applicant: MAZDA MOTOR CORPORATION, Hiroshima (JP)

(72) Inventors: Toshiki Yoshihara, Hatsukaichi (JP); Koji Hirai, Hiroshima (JP); Yoshitsugu Hanada, Hiroshima (JP); Kazuhito Hayashi, Cardiff Irvine, CA (US); Koji Kagami, Hiroshima (JP); Hiromichi Nomura, Hiroshima (JP); Kazuya Maruoka, Hiroshima (JP); Yuki Okamoto, Hatsukaichi (JP); Yuki Yoshida, Hiroshima (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 0 days.

(21) Appl. No.: 16/410,572

(22) Filed: May 13, 2019

(65) Prior Publication Data
US 2019/0366924 A1 Dec. 5, 2019

(30) Foreign Application Priority Data

Jun. 1, 2018 (JP) ................. 2018-106368

(51) Int. Cl.
B60Q 1/00 (2006.01)
B60Q 9/00 (2006.01)
(Continued)

(52) U.S. Cl.
CPC ......... B60Q 9/008 (2013.01); B60W 50/0097 (2013.01); B60W 50/08 (2013.01);
(Continued)

(58) Field of Classification Search
CPC ..... B60Q 9/008; B60W 50/097; B60W 50/08; B60W 2050/143; B60W 2050/146; B60W 2540/18; B60W 2550/20
See application file for complete search history.

(56) References Cited

U.S. PATENT DOCUMENTS 10,431,094 B2 * 10/2019 Noda .................... G08G 1/0112
2016/0140847 A1 * 5/2016 Kawamata ............. G08G 1/166
701/36
(Continued)

FOREIGN PATENT DOCUMENTS

EP 3021305 A2 5/2016
JP 2012-160103 A 8/2012

OTHER PUBLICATIONS

Extended European Search Report issued by the European Patent Office dated Nov. 7, 2019, which corresponds to EP19174095.0-1203 and is related to U.S. Appl. No. 16/410,572.

Primary Examiner — Phung Nguyen
(74) Attorney, Agent, or Firm — Studebaker & Brackett PC (57) ABSTRACT To provide an alarm system for a vehicle that can appropriately raise an alarm to a driver of a vehicle that is entering an intersection.
An alarm system 1 for a vehicle includes an alarm line setting part 51 that sets a right alarm line 61 and a left alarm line 62 both extending forward from a vehicle 2. The alarm line setting part 51 sets the length of the right alarm line 61 and the left alarm line 62 at L1 when the vehicle is running in a straight line. The alarm line setting part 51 sets the length of the right alarm line 61 or the left alarm line 62 at a length different from L1 when the vehicle 2 is to turn left or right at an intersection 83 to enter a first lane 81 or a second lane 82.

4 Claims, 8 Drawing Sheets (51) Int. Cl.
  *B60W 50/00* (2006.01)
  *B60W 50/08* (2020.01)
  *B60W 50/14* (2020.01)

(52) U.S. Cl.
  CPC . *B60W 2050/143* (2013.01); *B60W 2050/146* (2013.01); *B60W 2540/18* (2013.01); *B60W 2554/00* (2020.02)

(56) References Cited

U.S. PATENT DOCUMENTS

| | | | |
|---|---|---|---|
| 2017/0236413 A1* | 8/2017 | Takagi | B60W 40/09 |
| | | | 701/117 |
| 2018/0144637 A1 | 5/2018 | Ikedo et al. | |
| 2018/0178721 A1* | 6/2018 | Ikedo | B60R 16/0231 |
| 2019/0176887 A1* | 6/2019 | Yasuda | B62D 15/029 |

\* cited by examiner

ALARM SYSTEM FOR VEHICLE

BACKGROUND OF THE INVENTION

Field of the Invention

The present invention relates to an alarm system for a vehicle. In particular, it relates to an alarm system for a vehicle that raises an alarm in response to an object approaching the vehicle.

Description of the Related Art

Systems that raise an alarm in response to an object approaching have been proposed. For example, Japanese Patent Laid-Open No. 2012-160103 discloses a system that determines the possibility of an object located at the side of a vehicle colliding with the vehicle based on the distance between the object and the vehicle or the relative velocity of the object with respect to the vehicle. When the system determines that the object can collide with the vehicle, the system raises an alarm to the driver of the vehicle. Japanese Patent Laid-Open No. 2012-160103 also discloses that an alarm is raised when a vehicle is to turn left or right at an intersection or the like.

Consider a case where a vehicle running in a predetermined lane turns left or right at an intersection to enter a lane intersecting with the predetermined lane. In the following description, when the vehicle enters the intersection, of a plurality of lanes intersecting with the lane in which the vehicle is running, a lane closer to the vehicle will be referred to as a "first lane", and an opposing lane to the first lane that is further from the vehicle will be referred to as a "second lane". For example, in a situation where the traffic laws prescribe that vehicles run in the left lane, such as in Japan, the lane which the vehicle having turned left at the intersection enters corresponds to the "first lane", and the lane which the vehicle having turned right at the intersection enters corresponds to the "second lane".

With a two-lane, two-way road (that is, a road provided with no median strip or the like), for example, the lateral distance between vehicles in the opposing lanes may decrease even though the vehicles are running safely. In particular, when a vehicle turns left or right at an intersection to enter the first lane, the vehicle temporarily comes closer to another vehicle in the second lane. Such an approach is inevitable because of the structure of the intersection and does not necessarily lead to collision of the vehicle with the other vehicle with high possibility. In addition, since the driver tends to direct their attention in the direction of traveling of the vehicle, the driver is highly likely to recognize the other vehicle in the second lane. Even in such a situation, the system described in Japanese Patent Laid-Open No. 2012-160103 can raise an alarm based on the approach of the other vehicle and irritate the driver.

When the vehicle turns right or left at the intersection to enter the second lane, the driver tends to direct more of their attention in the direction of traveling of the vehicle and less attention in the opposite direction. In such a case, an alarm concerning another vehicle approaching from the opposite direction needs to be raised with high reliability.

As can be seen, when the vehicle is to turn left or right at the intersection, an alarm needs to be appropriately raised according to the state of running of the vehicle.

The present invention has been devised to solve the problems described above, and an object of the present invention is to provide an alarm system for a vehicle that can appropriately raise an alarm to a driver of a vehicle that is entering an intersection.

SUMMARY OF THE INVENTION

To solve the problems described above, the present invention provides an alarm system for a vehicle, comprising: an alarm line setting part that sets an alarm line that extends forward from the vehicle; an object detection part that detects an object on a side of the vehicle; a collision determination part that determines whether or not the object crosses the alarm line within a predetermined time; an alarm unit control part that activates an alarm unit when the collision determination part determines that the object crosses the alarm line within the predetermined time; and a left/right-turn determination part that determines that the vehicle is to turn left or right at an intersection, wherein, provided that, when the vehicle enters the intersection, of a plurality of lanes at the intersection that intersect with a lane in which the vehicle is running, a lane closer to the vehicle is defined as a first lane, and an opposing lane to the first lane that is further from the vehicle is defined as a second lane; the alarm line setting part sets a length of the alarm line at a first length when the vehicle is running in a straight line; the alarm line setting part and sets the length of the alarm line at a length different from the first length when the vehicle is to turn left or right at the intersection to enter the first lane or the second lane.

With this arrangement, when the object will cross the alarm line within the predetermined time, it can be determined that the object can collide with the vehicle, and an alarm can be raised. The alarm line setting part sets the length of the alarm line at different lengths between when the vehicle is running in a straight line and when the vehicle is turn left or right at the intersection to enter the first lane or the second lane. In this way, the alarm line can be set according to the state of running of the vehicle, and the determination of collision can be made based on the alarm line. As a result, alarms that are raised even though the possibility of an object colliding with the vehicle is low can be reduced, or an alarm can be raised to alert the driver to an object that is approaching from the direction to which the driver tends to pay less attention.

According to the present invention, preferably, the alarm line setting part sets the length of the alarm line at a second length shorter than the first length when the vehicle is to turn left or right at the intersection to enter the first lane.

With this arrangement, when the vehicle is to turn left or right at the intersection to enter the first lane, the alarm line is set to be shorter than when the vehicle is running in a straight line. As a result, even when the vehicle temporarily comes closer to an object in the second lane when the vehicle is entering the first lane, a useless alarm based on the approach can be suppressed.

According to the present invention, preferably, the alarm line setting part sets, as the alarm line, a right alarm line for an object on a right side and a left alarm line that is set for an object on a left side independently from the right alarm line; the alarm line setting part sets the length of the right alarm line at the second length when the vehicle is to turn right at the intersection to enter the first lane; and the alarm line setting part sets the length of the left alarm line at the second length when the vehicle is to turn left at the intersection to enter the first lane.

With this arrangement, the possibility of an object on the right side of the vehicle colliding with the vehicle and the possibility of an object on the left side of the vehicle colliding with the vehicle can be independently determined based on the right alarm line and the left alarm line, respectively. As a result, the precision of the determination can be improved.

Furthermore, when the vehicle is to turn right at the intersection to enter the first lane (provided that the traffic laws prescribe that vehicles run in the right lane, such as in the U.S.), the alarm line setting part sets the length of the right alarm line at the second length. Furthermore, when the vehicle is to turn left at the intersection to enter the first lane (provided that the traffic laws prescribe that vehicles run in the left lane, such as in Japan), the alarm line setting part sets the length of the left alarm line at the second length. In this way, even when the vehicle temporarily comes closer to an object in the second lane when the vehicle is entering the first lane, a useless alarm based on the approach can be suppressed.

That is, with this arrangement, both improvement of the precision of the determination and suppression of a useless alarm can be achieved.

According to the present invention, preferably, the alarm line setting part sets the length of the left alarm line at the first length or a third length longer than the first length when the vehicle is to turn right at the intersection to enter the first lane; and the alarm line setting part sets the length of the right alarm line at the first length or the third length when the vehicle is to turn left at the intersection to enter the first lane.

With this arrangement, the precision of determination of collision of an object on the side opposite to the direction in which the vehicle is to travel can be improved. That is, with this arrangement, when the vehicle is entering the first lane, an alarm concerning an object that is apt to escape attention of the driver can be raised with reliability while suppressing a useless alarm based on the vehicle coming closer to an object in the second lane.

According to the present invention, preferably, the alarm line setting part sets the length of the alarm line at a fourth length longer than the first length when the vehicle is to turn left or right at the intersection to enter the second lane.

With this arrangement, the precision of the determination of collision of an object on the side opposite to the direction in which the vehicle is to travel can be improved. That is, with this arrangement, when the vehicle is entering the second lane, an alarm concerning an object that is apt to escape attention of the driver can be raised with reliability.

According to the present invention, preferably, the left/right-turn determination part determines that the vehicle is to turn left or right at the intersection based on at least one of a turn signal switch and a steering angle.

With this arrangement, it can be simply determined that the vehicle is to turn left or right at an intersection.

The present invention can provide an alarm system for a vehicle that can appropriately raise an alarm to a driver of a vehicle that is entering an intersection.

DETAILED DESCRIPTION OF THE PREFERRED EMBODIMENTS

In the following, embodiments will be described with reference to the accompanying drawings. To facilitate understanding of the description, the same components are denoted by like reference numerals throughout the drawings, and redundant descriptions thereof will be omitted.

First Embodiment

Figure 1:
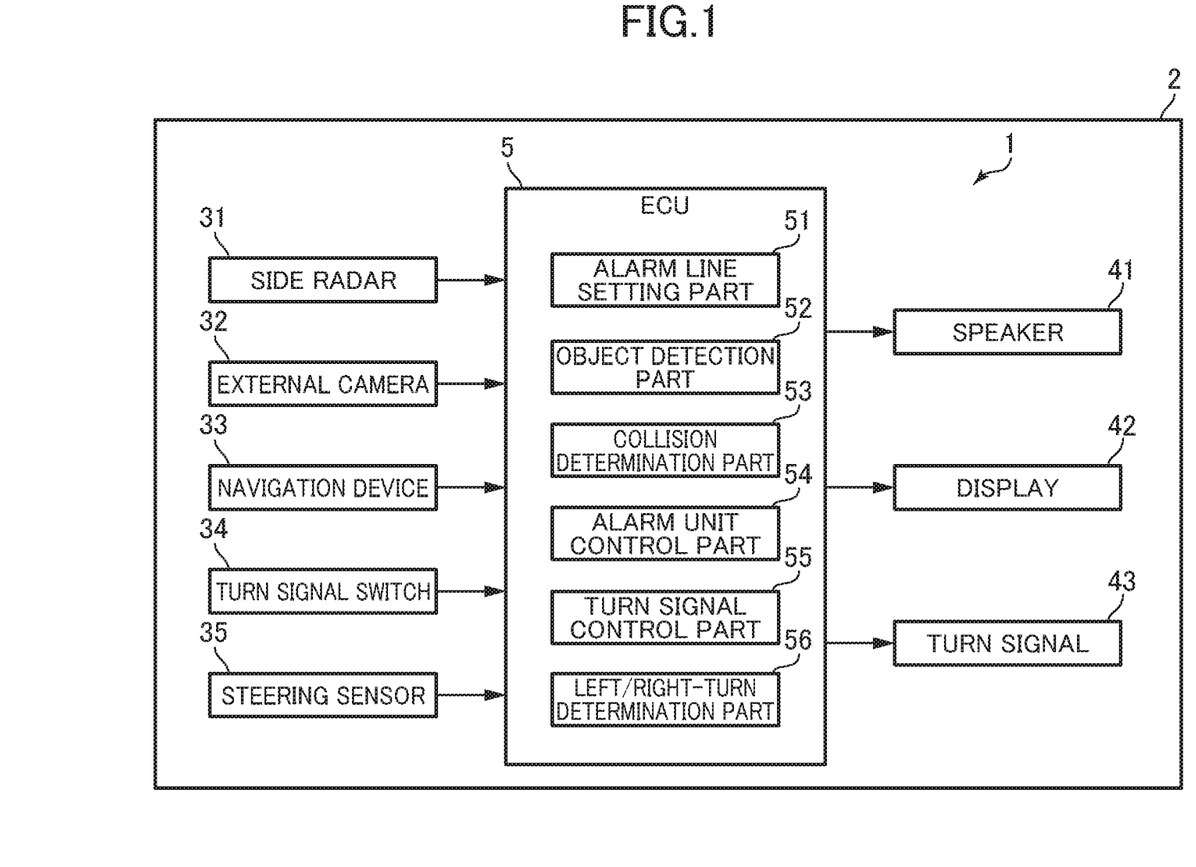
FIG. 1 is a block diagram showing an alarm system for a vehicle according to a first embodiment of the present invention.

First, with reference to FIG. 1, a configuration of an alarm system 1 for a vehicle (referred to simply as an alarm system 1, hereinafter) according to a first embodiment will be described. FIG. 1 is a block diagram showing the alarm system 1.

The alarm system 1 is mounted on a vehicle and raises an alarm to the driver of the vehicle to alert the driver. In this specification, the vehicle on which the alarm system 1 is mounted will be referred to as a "vehicle 2". The alarm system for a vehicle according to the present invention can be applied not only to a four-wheeled vehicle but also to a two-wheeled vehicle.

In this specification, the direction in which the vehicle 2 runs forward is defined as "forward", and the direction in which the vehicle 2 runs backward is defined as "backward". The left side of the vehicle running forward is defined as "left", and the right side of the vehicle running forward is defined as "right".

The alarm system 1 includes a side radar 31, an external camera 32, a navigation device 33, a turn signal switch 34, and a steering sensor 35. The alarm system 1 further includes a speaker 41, a display 42, a turn signal 43, and an electronic control unit (ECU) 5.

The side radar 31 is used to detect the presence of an object outside of the vehicle 2, the velocity of the object, and the distance between the object and an alarm line, which will be described later. Detectable objects include a vehicle, a structure fixed on a road, and a pedestrian, for example. The vehicle is not limited to a four-wheeled vehicle but may be any running body, such as a two-wheeled vehicle or a bicycle. As described later, the detections described above performed by the side radar 31 are targeted to an object in a detection region set at a side of the vehicle 2. The side radar 31 is a millimeter wave radar (which has an operating frequency of 76 GHz to 77 GHz), for example, and has antennas directed to the left and right of the vehicle 2. Each antenna may be a single antenna used for both transmission and reception or a set of a transmitting antenna element and a receiving antenna element. The side radar 31 transmits a measuring wave from the antennas to the sides of the vehicle 2 and receives a reflection wave from an object. The side radar 31 transmits a signal corresponding to the received reflection wave to the ECU 5.

The external camera 32 takes an image of a range including the detection region of the side radar 31 and obtains image information. The external camera 32 is an image sensor, for example, and is installed on a rear view mirror (not shown) or the like of the vehicle 2. The external camera 32 transmits a signal corresponding to the obtained image information.

The navigation device 33 provides predetermined information to a passenger of the vehicle 2. The navigation device 33 stores map information or obtains map information by communicating with a server outside the vehicle 2. The map information includes information about roads, intersections, traffic lights, buildings or the like. The navigation device 33 has a sensor that detects the location of the vehicle 2, such as a global positioning system (GPS) sensor or a self-contained navigation sensor. The navigation device 33 determines the location of the vehicle 2 on a map, audibly or visually provides information about the location, and transmits a signal corresponding to the information to the ECU 5.

The turn signal switch 34 accepts a selective operation on a turn signal lever (not shown) by the driver (that is, an operation of selecting at least one of turn signals 43 (see FIG. 2) provided on left and right side parts of the vehicle 2). The turn signal switch 34 transmits a signal corresponding to turn on/off of the turn signal 43.

The steering sensor 35 detects a steering direction and a steering angle of a steering wheel of the vehicle 2. The steering sensor 35 has an encoder, for example, and counts slits that rotate with the steering wheel. The steering sensor 35 transmits a signal corresponding to the detected steering direction and steering angle to the ECU 5.

The speaker 41 and the display 42 are examples of alarm devices of an alarm unit according to the present invention. The speaker 41 operates based on a received control signal and raises an alarm by outputting an alarm or other sound. The display 42 is a liquid crystal panel, for example. The display 42 operates based on a received control signal and raises an alarm by displaying a picture, text or the like.

Figure 2:
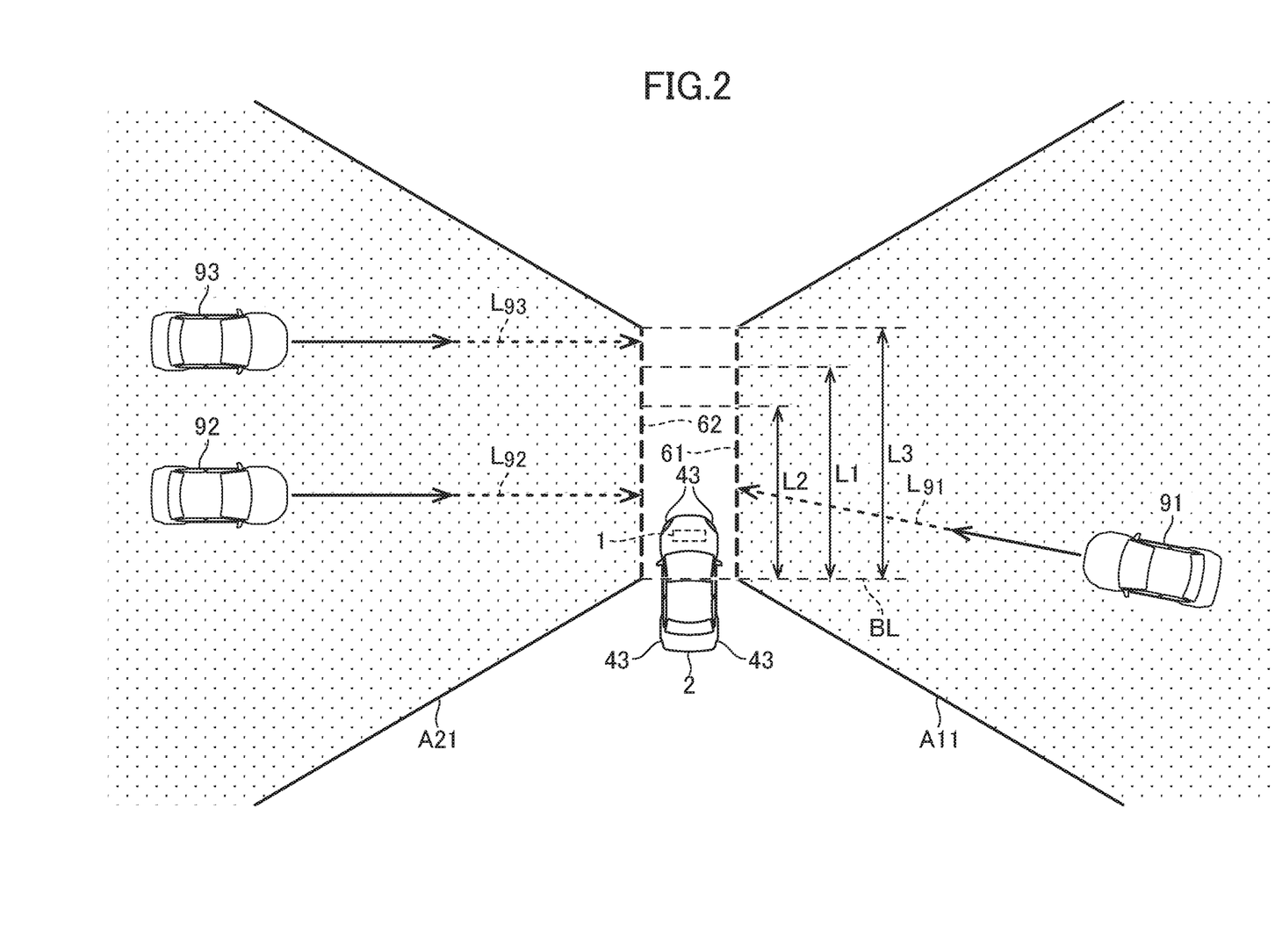
FIG. 2 is a diagram for illustrating determination of collision performed by the alarm system for a vehicle shown in FIG. 1.

The turn signals 43 are directional indicators provided on left and right side parts of the vehicle 2 (see FIG. 2). The turn signal 43 operates based on a received control signal and blinks to inform that the vehicle 2 will turn.

The ECU 5 is a controller that controls equipment by transmitting and receiving signals. The ECU 5 may be partially or wholly formed by an analog circuit or formed as a digital processor. The ECU 5 includes an alarm line setting part 51, an object detection part 52, a collision determination part 53, an alarm unit control part 54, a turn signal control part 55, and a left/right-turn determination part 56.

FIG. 1 shows functions of the ECU 5 in the form of blocks. However, the analog circuit or the software module incorporated in the digital processor of the ECU 5 is not necessarily divided as shown in FIG. 1. That is, the functional blocks shown in FIG. 1 may be further divided, or some of the functional blocks may be integrated into a single functional block. Those skilled in the art can modify the internal configuration of the ECU 5 as appropriate, as far as the processes described later can be performed.

The alarm line setting part 51 sets an alarm line. The alarm line is a virtual line set in the vicinity of the vehicle 2, which is used for determination of collision by the collision determination part 53. The alarm line will be described in more detail later.

The object detection part 52 detects the direction of movement of an object outside the vehicle 2, the distance of the object from an alarm line, and the relative velocity of the object with respect to the alarm line. Specifically, the object detection part 52 performs a predetermined calculation based on a signal received from the side radar 31 and performs the detections based on the calculation result.

The collision determination part 53 performs determination of collision. In determination of collision, it is determined whether or not an object outside the vehicle 2 will cross the alarm line within a predetermined time. The determination of collision will be described in more detail later.

The alarm unit control part 54 transmits a control signal to the speaker 41 or the display 42 based on the result of the determination of collision by the collision determination part 53. Specifically, the alarm unit control part 54 transmits a control signal to activate the speaker 41 or the display 42 when the collision determination part 53 determines that the object can collide with the vehicle 2.

The turn signal control part 55 transmits a control signal to the turn signal(s) based on the signal received from the turn signal switch 34. Specifically, based on the signal received from the turn signal switch 34, the turn signal control part 55 transmits a control signal to at least one of the turn signals 43 provided on the left and right side parts of the vehicle 2 to activate the turn signal(s) 43.

The left/right-turn determination part 56 determines whether or not the vehicle 2 is to turn left or right at an intersection. Specifically, the left/right-turn determination part 56 determines whether or not the vehicle 2 is located in the vicinity of an intersection based on signals received from the external camera 32 or the navigation device 33. The left/right-turn determination part 56 further determines whether or not the vehicle 2 is to turn left or right based on signals received from the turn signal switch 34 or the steering sensor 35. The "intersection" is not limited to a crossroad but may be a T junction, a roundabout intersection or the like.

Next, with reference to FIG. 2, the determination of collision performed by the alarm system 1 will be described. FIG. 2 is a diagram for illustrating the determination of collision performed by the alarm system 1.

When the vehicle 2 is stopped or running at a relatively low velocity (10 km/h or less, for example), the alarm line setting part 51 (see FIG. 1) of the ECU 5 sets a right alarm line 61 and a left alarm line 62, as shown in FIG. 2. The right alarm line 61 and the left alarm line 62 are invisible virtual lines. The right alarm line 61 is set at a predetermined distance (1 m or less, for example) in the right direction from the right edge of the vehicle 2, and the left alarm line 62 is set at a predetermined distance (1 m or less, for example) in the left direction from the left edge of the vehicle 2. That is, the distance between the right alarm line 61 and the left alarm line 62 is greater than the width of the vehicle 2.

The right alarm line 61 and the left alarm line 62 extend in the forward direction of the vehicle 2 from a base line BL as a base end. The base line BL is a virtual line set rearward from the front edge of the vehicle 2 by a predetermined distance (2 m, for example). The right alarm line 61 and the left alarm line 62 extend straight substantially in parallel with each other in the longitudinal direction of the vehicle 2.

The object detection part 52 (see FIG. 1) of the ECU 5 sets a detection region A11 at the right side of the right alarm line 61, and a detection region A21 at the left side of the left alarm line 62. The detection region A11 is defined by the right alarm line 61, a line at a predetermined distance in the right direction from the right alarm line 61, and lines extending from the right alarm line 61 at approximately 135° with respect to the right alarm line 61. The detection region A21 is defined by the left alarm line 62, a line at a predetermined distance in the left direction from the left alarm line 62, and lines extending from the left alarm line 62 at approximately 135° with respect to the left alarm line 62. The object detection part 52 detects an object in the detection regions A11 and A21 based on the signal received from the side radar 31.

In the following, the determination of collision of another vehicle 91 in the detection region A11 approaching the vehicle 2 will be described. When a virtual line $L_{91}$ extending in the direction of movement of the other vehicle 91 intersects with the right alarm line 61, the collision determination part 53 (see FIG. 1) of the ECU 5 calculates a time to collision (TTC) for the other vehicle 91 with respect to the right alarm line 61 based on information detected by the object detection part 52. In general, the TTC is expressed by the following formula f1, provided that the distance between relevant objects is defined as $L_0$, and the relative velocity between the objects is defined as $V_0$. The relative velocity $V_0$ of the object is positive when the object is approaching the alarm line. The formula f1 is derived from the equation of motion on the condition that the object is moving at a constant velocity.

[Formula 1]

$$TTC = \frac{L_0}{V_0} \quad \text{(f1)}$$

The collision determination part 53 determines whether or not the other vehicle 91 will cross the right alarm line 61 within a predetermined time based on the calculated TTC. Specifically, when the TTC is equal to or less than a preset threshold (2 seconds, for example), the collision determination part 53 determines that the other vehicle 91 will cross the right alarm line 61 within a predetermined time (2 seconds, for example). Then, the other vehicle 91 can collide with the vehicle 2.

As described above, the alarm system 1 determines whether the object at the right side of the vehicle 2 can collide with the vehicle 2 or not with respect to the right alarm line 61. Similarly, the alarm system 1 determines whether the object at the left side of the vehicle 2 can collide with the vehicle 2 or not with respect to the left alarm line 62.

When the vehicle 2 is stopped or is running in a straight line, the alarm line setting part 51 sets the length of the right alarm line 61 and the left alarm line 62 at L1 (7 m, for example). L1 is an example of a first length according to the present invention. The alarm line setting part 51 can also set the length of the right alarm line 61 and the left alarm line 62 at a different length than L1. Specifically, the alarm line setting part 51 may set the length of the right alarm line 61 and the left alarm line 62 at L2 (5 m, for example), which is shorter than L1, or L3 (9 m, for example), which is longer than L1 (that is, L2<L1<L3). L2 is an example of a second length according to the present invention, and L3 is an example of a third length and a fourth length according to the present invention.

Such a change in length of the right alarm line 61 and the left alarm line 62 has an effect on the determination of collision. As an example, the determination of collision in a case where other vehicles 92 and 93 in the detection region A21 are approaching the left alarm line 62 will be described.

When the length of the left alarm line 62 is set at L3, both virtual lines $L_{92}$ and $L_{93}$ extending in the direction of traveling of the other vehicles 92 and 93 intersect with the left alarm line 62. Therefore, the collision determination part 53 performs the determination of collision of the other vehicles 92 and 93.

However, when the length of the left alarm line 62 is set at L1 or L2, the virtual line $L_{93}$ extending in the direction of traveling of the other vehicle 93 does not intersect with the left alarm line 62. Therefore, the collision determination part 53 does not perform the determination of collision of the other vehicle 93 and performs only the determination of collision of the other vehicle 92. That is, the alarm unit control part 54 (see FIG. 1) of the ECU 5 does not activate the speaker 41 or the display 42 (see FIG. 1) in response to the other vehicle 93 approaching.

The alarm system 1 configured described above is particularly advantageous in a situation where there is a blind spot for the driver of the vehicle 2. An example of the situation where there is a blind spot for the driver is a situation where there is a wall near the lane in which the vehicle is running or a situation where there is another vehicle parked around the vehicle 2. That is, when an object in the blind spot is approaching the vehicle 2 and can collide with the vehicle 2, at least one of the speaker 41 and the display 42 raises an alarm to alert the driver to the object so that the driver can operate the vehicle to avoid collision.

Figure 3:
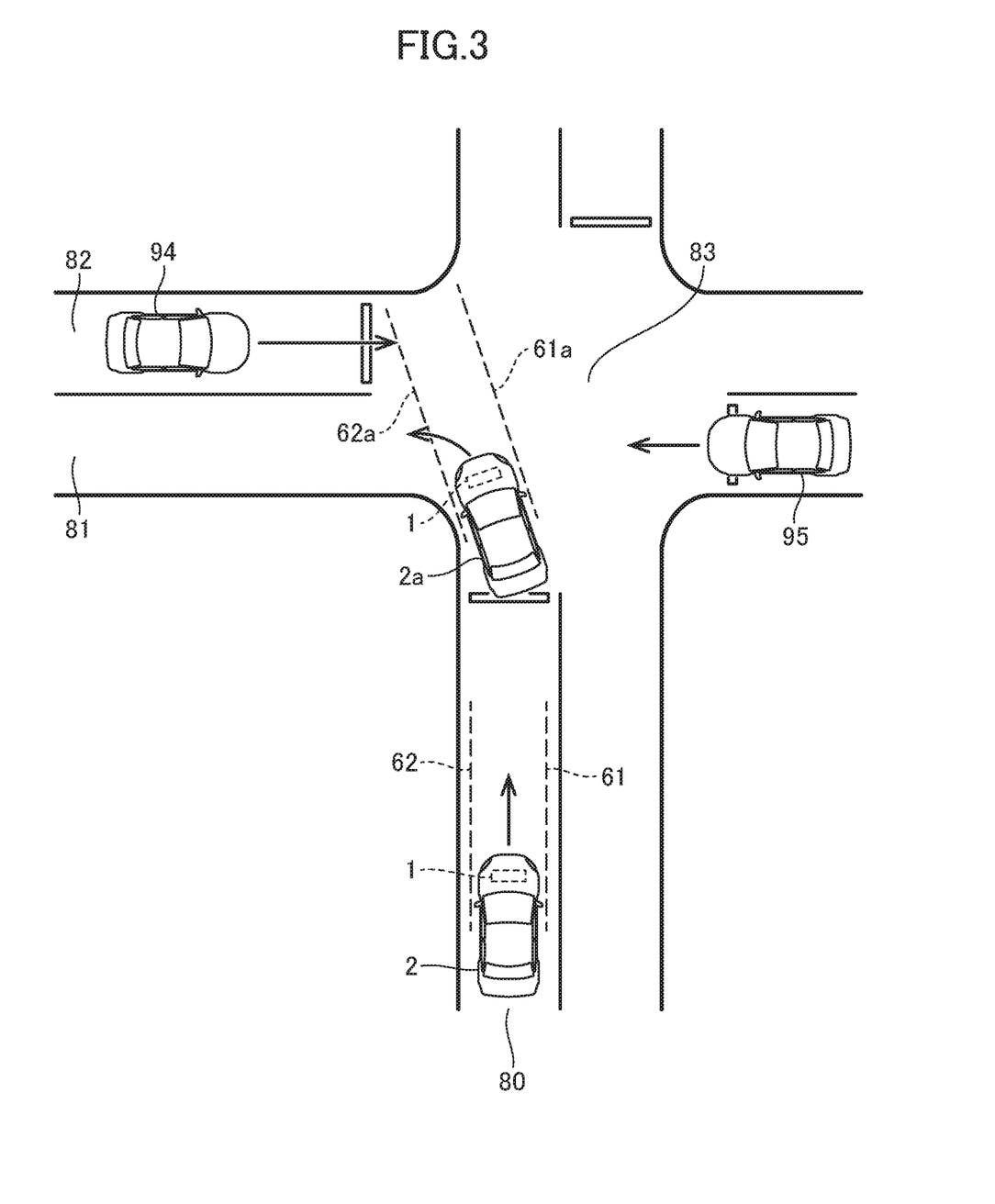
FIG. 3 is a diagram for illustrating determination of collision at an intersection.
Figure 4:
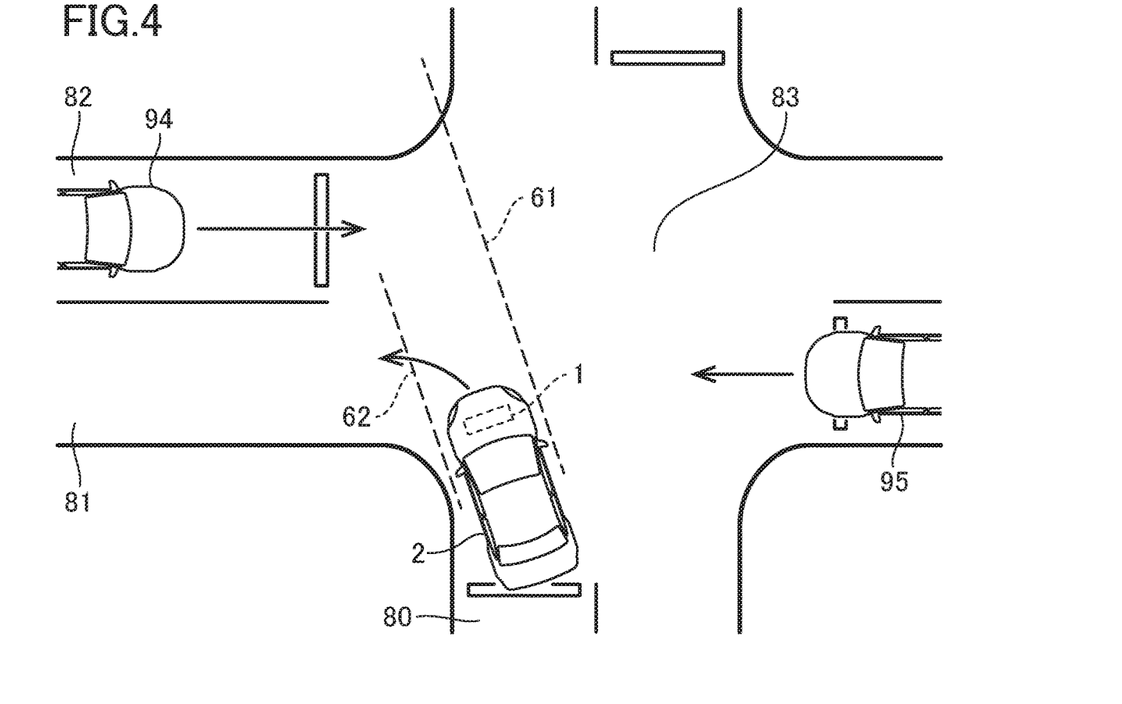
FIG. 4 is a diagram for illustrating determination of collision at the intersection.
Figure 5:
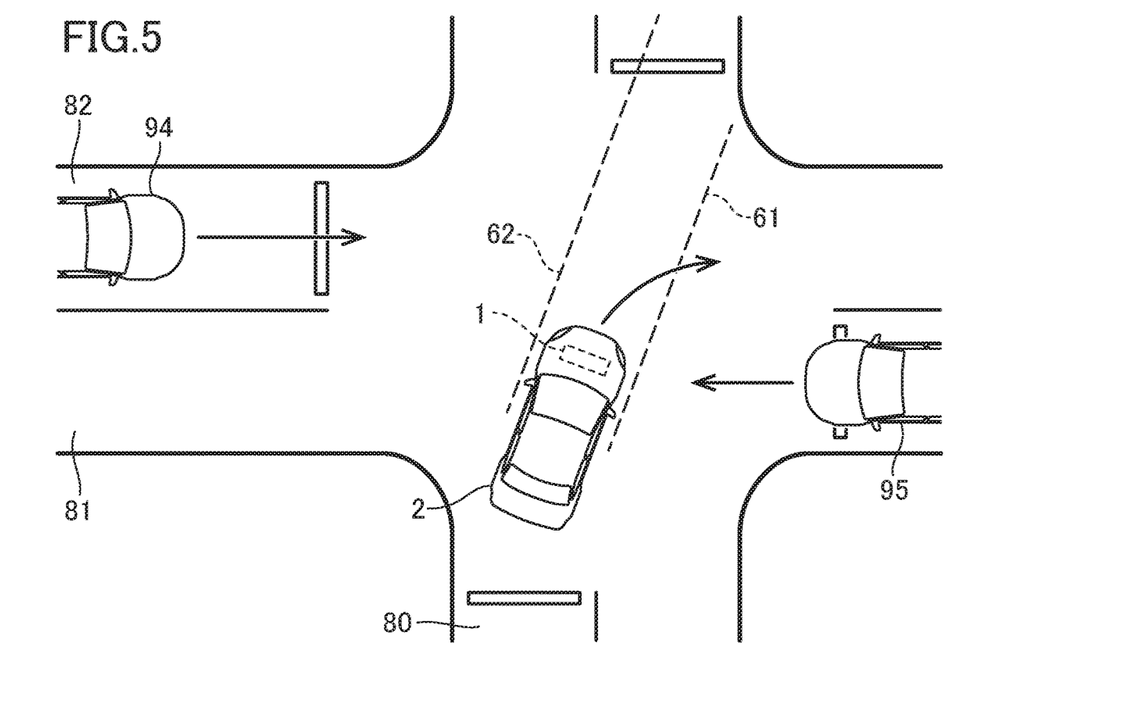
FIG. 5 is a diagram for illustrating determination of collision at the intersection.

Next, with reference to FIGS. 3 to 5, determination of collision at an intersection will be described. FIGS. 3 to 5 are diagrams for illustrating determination of collision at an intersection 83. FIGS. 3 to 5 show situations where the traffic laws prescribe that vehicles run in the left lane, such as in Japan.

At the intersection 83, a lane 80 intersects with lanes 81 and 82. In the following description, the lane closer to the vehicle 2 when the vehicle 2 enters the intersection 83 will be referred to as a "first lane 81", and the opposing lane to the first lane 81 that is further from the vehicle 2 will be referred to as a "second lane 82".

As shown in FIG. 3, when the vehicle 2 running in a straight line in the lane 80 approaches the intersection 83 and decelerates (to 10 km/h or less), the alarm system 1 sets the right alarm line 61 and the left alarm line 62. At this point, the length of the right alarm line 61 and the left alarm line 62 is set at L1 (see FIG. 2).

Now, consider a comparative example in which a vehicle 2a is to turn left at the intersection 83. When the vehicle 2a turns left to enter the first lane 81, the vehicle 2a may temporarily come closer to another vehicle 94 in the second lane 82. In such a case, when the length of the left alarm line 62 is still set at L1, the virtual line in the direction of traveling of the other vehicle 94 may intersect with the left alarm line 62.

When the virtual line intersects with the left alarm line 62, the alarm system 1 calculates the TTC for the other vehicle 94. When the TTC is equal to or less than a threshold, the alarm system 1 determines that the other vehicle 94 can cross the left alarm line 62 within a predetermined time. That is, the alarm system 1 determines that the other vehicle 94 can collide with the vehicle 2a and raises an alarm to the driver of the vehicle 2a.

However, such an approach of the other vehicle 94 to the vehicle 2a is inevitable because of the structure of the intersection 83 and does not necessarily lead to collision of the other vehicle 94 with the vehicle 2a with high possibility. In addition, since the driver tends to direct their attention in the direction of traveling of the vehicle 2a, the driver is highly likely to recognize the other vehicle 94 in the second lane 82. When the alarm system 1 raises an alarm concerning the other vehicle 94 in such a case, the alarm can irritate the driver. On the other hand, when the vehicle 2a is to turn left to enter the first lane 81, another vehicle 95 or the like approaching from the right is apt to escape attention of the driver.

In view of this, when the vehicle 2 is to turn left at the intersection 83 to enter the first lane 81, the alarm system 1 according to the first embodiment sets the length of the right alarm line 61 and the left alarm line 62 as shown in FIG. 4.

First, the alarm system 1 sets the length of the left alarm line 62 at L2 (see FIG. 2). That is, the alarm system 1 reduces the length of the left alarm line 62 compared with when the vehicle 2 is running in a straight line. As a result, even when the vehicle 2 temporarily comes closer to the other vehicle 94 in the second lane 82 when the vehicle 2 enters the first lane 81, the vertical line in the direction of traveling of the other vehicle 94 is less likely to intersect with the left alarm line 62. As a result, the alarm system 1 is less likely to determine that the other vehicle 94 crosses the left alarm line 62 and thus can reduce useless alarms based on the approach of the vehicle 94.

In addition, the alarm system 1 sets the length of the right alarm line 61 at L3 (see FIG. 2). That is, the alarm system 1 increases the length of the right alarm line 61 compared with when the vehicle 2 is running in a straight line. As a result, when the vehicle 2 enters the first lane 81, the virtual line in the direction of traveling of the other vehicle 95 is more likely to intersect with the right alarm line 61. As a result, the precision of the determination of collision with the other vehicle 95 approaching from the right, which is apt to escape attention of the driver, can be improved.

When the vehicle 2 is to turn right at the intersection 83 to enter the second lane 82, the alarm system 1 sets the length of the left alarm line 62 at L3 (see FIG. 2), as shown in FIG. 5. That is, the alarm system 1 increases the length of the left alarm line 62 compared with when the vehicle 2 is running in a straight line. As a result, when the vehicle 2 enters the second lane 82, the virtual line in the direction of traveling of the other vehicle 94 is more likely to intersect with the left alarm line 62. As a result, the precision of the determination of collision with the other vehicle 94 approaching from the left, which is apt to escape attention of the driver, can be improved.

Figure 6:
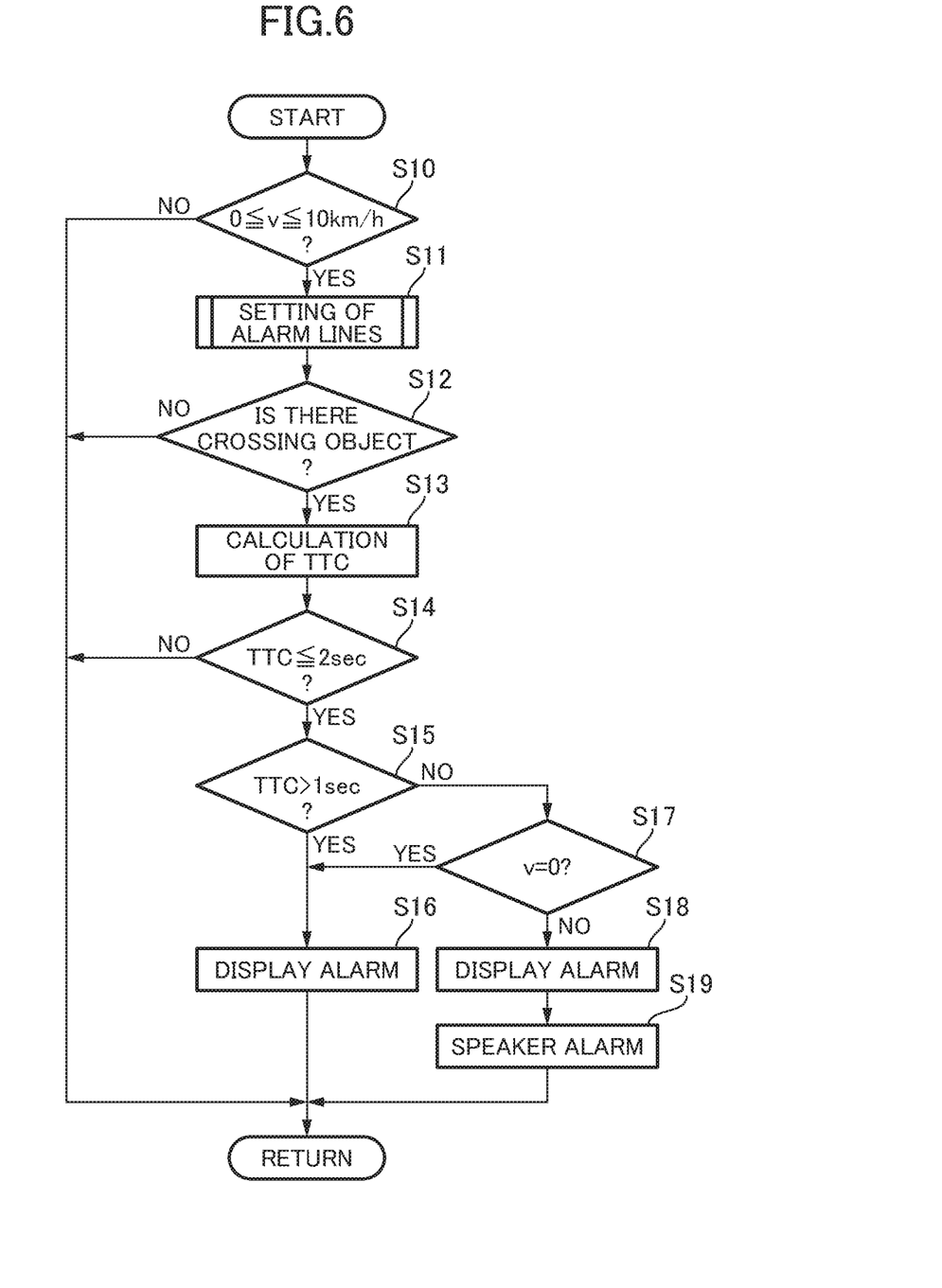
FIG. 6 is a flowchart showing a process performed by an ECU shown in FIG. 1.
Figure 7:
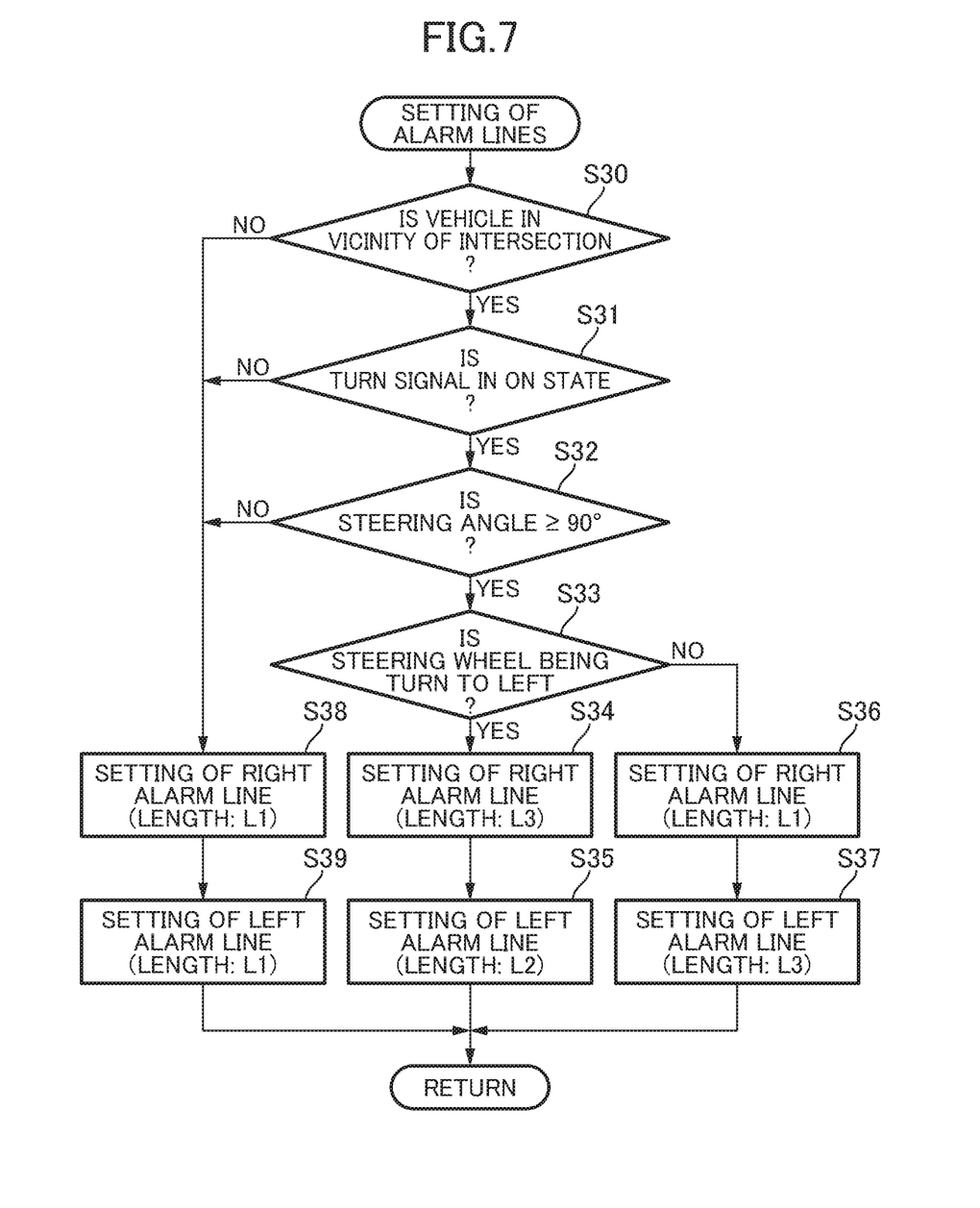
FIG. 7 is a flowchart showing a process performed by the ECU shown in FIG. 1.

Next, with reference to FIGS. 6 and 7, processes performed by the ECU 5 (see FIG. 1) will be described. FIGS. 6 and 7 are flowcharts showing processes performed by the ECU 5. The processes are repeatedly performed at a predetermined period. In the following description, for ease of explanation, any processing that is performed by a functional block of the ECU 5 in a strict sense will be described as being performed by the ECU 5.

First, in Step S10 shown in FIG. 6, the ECU 5 determines whether or not the velocity v of the vehicle 2 falls within a range from 0 km/h to 10 km/h inclusive. The ECU 5 determines the velocity v of the vehicle 2 based on the signal received from the speed sensor (not shown). When it is determined that the velocity v falls within the range (YES in Step S10), the ECU 5 proceeds to Step S11.

In Step S11, the ECU 5 sets the alarm lines. With reference to FIG. 7, a process of the ECU 5 setting the alarm lines will be described.

In Step S30 shown in FIG. 7, the ECU 5 determines whether or not the vehicle 2 is located in the vicinity of an intersection. The ECU 5 performs the determination based on the signal received from the external camera 32 or the navigation device 33 (see FIG. 1). When it is determined that the vehicle 2 is located in the vicinity of an intersection (YES in Step S30), the ECU 5 proceeds to Step S31.

In Step S31, the ECU 5 determines whether or not the turn signal switch 34 (see FIG. 1) is in an ON state. That is, the ECU 5 determines whether or not any turn signal 43 is operating. When it is determined that the turn signal switch 34 is in the ON state (when YES in Step S31), the ECU 5 proceeds to Step S32.

In Step S32, the ECU 5 determines whether or not the steering angle of the steering wheel of the vehicle 2 is equal to or greater than 90°. The ECU 5 determines the steering angle of the steering wheel based on the signal received from the steering sensor 35 (see FIG. 1). When it is determined that the steering angle is equal to or greater than 90° (when YES in Step S32), the ECU 5 proceeds to Step S33.

In Step S33, the ECU 5 determines whether or not the steering wheel of the vehicle 2 is being turned to the left. That is, the ECU 5 determines whether or not the vehicle 2 is to change the direction of traveling to the left. The ECU 5 determines the steering direction of the steering wheel based on the signal received from the steering sensor 35. When the steering angle of the steering wheel is equal to or greater than 90° (YES in Step S32), and the steering direction of the same is left (YES in Step S33), the vehicle 2 is considered to be turning left. When it is determined that the steering wheel is being turned to the left (when YES in Step S33), the ECU 5 proceeds to Step S34.

In Step S34, the ECU 5 sets the length of the right alarm line 61 at L3 (see FIGS. 2 and 4). In Step S35 following Step S34, the ECU 5 sets the length of the left alarm line 62 at L2 (see FIGS. 2 and 4). Alternatively, in Step S34, the ECU 5 may set the length of the right alarm line 61 at L1.

On the other hand, when it is determined in Step S33 that the steering wheel of the vehicle 2 is not being turned to the left (when NO in Step S33, or in other words, when the steering wheel is being turned to the right), the ECU 5 proceeds to Step S36. When the steering angle of the steering wheel is equal to or greater than 90° (YES in Step S32), and the steering direction of the same is right (NO in Step S33), the vehicle 2 is considered to be turning right.

In Step S36, the ECU 5 sets the length of the right alarm line 61 at L1 (see FIGS. 2 and 5). In Step S37 following Step S36, the ECU 5 sets the length of the left alarm line 62 at L3 (see FIGS. 2 and 5).

When it is determined in Step S30 that the vehicle 2 is not located in the vicinity of an intersection (NO in Step S30), when it is determined in Step S31 that the turn signal switch 34 is not in the ON state (NO in Step S31), or when it is determined in Step S32 that the steering angle of the steering wheel of the vehicle 2 is not equal to or greater than 90° (NO in Step S32), the ECU 5 proceeds to Step S38.

In Step S38, the ECU 5 sets the length of the right alarm line 61 at L1. In Step S39 following Step S38, the ECU 5 sets the length of the left alarm line 62 at L1.

Referring to FIG. 6 again, the process performed by the ECU 5 will be described. After completing setting of the right alarm line 61 and the left alarm line 62 in Step S11, the ECU 5 proceeds to Step S12.

In Step S12, the ECU 5 determines whether or not, in the detection region A11 or the detection region A21 (see FIG. 2), there is an object (referred to simply as a "crossing object", hereinafter) whose virtual line extending in the direction of traveling thereof intersects with the right alarm line 61 or the left alarm line 62. The ECU 5 performs the determination based on the signal received from the side radar 31 (see FIG. 1). When it is determined that there is a crossing object (YES in Step S12), the ECU 5 proceeds to Step S13.

In Step S13, the ECU 5 calculates the TTC for the crossing object. The ECU 5 calculates the distance between the crossing object and the right alarm line 61 or the left alarm line 62 and the velocity of the crossing object with respect to the alarm line (that is, the relative velocity) based on the signal received from the side radar 31. Furthermore, the ECU 5 calculates the TTC according to the formula f1 described above. When a plurality of crossing objects are detected, the ECU 5 calculates the TTC for each crossing object. After completing calculation of the TTC, the ECU 5 proceeds to Step S14.

In Step S14, the ECU 5 determines whether or not the TTC calculated in Step S13 is equal to or less than 2 seconds. When it is determined that the TTC is equal to or less than 2 seconds (YES in Step S14), the ECU 5 proceeds to Step S15.

In Step S15, the ECU 5 determines whether or not the TTC calculated in Step S13 is more than 1 second. When the TTC is more than 1 second, the necessity for alarm is relatively low. When it is determined that the TTC is more than 1 second (YES in Step S15), the ECU 5 proceeds to Step S16.

In Step S16, the ECU 5 activates the display 42 (see FIG. 1). Specifically, the ECU 5 transmits a control signal to the display 42, and in response to the control signal, the display 42 provides an indication that an object outside the vehicle 2 can collide with the vehicle 2. After making the display 42 display the alarm, the ECU 5 ends the process. That is, when the TTC is equal to or less than 2 seconds (YES in Step S14) and more than 1 second (YES in Step S15), the necessity for alarm is relatively low, so that the ECU 5 does not activate the speaker 41 (see FIG. 1) but activates the display 42 to raise an alarm to the driver of the vehicle 2.

On the other hand, when the TTC is equal to or less than 1 second, the necessity for alarm is relatively high. When it is determined in Step S15 that the TTC calculated in Step S13 is not more than 1 second (NO in Step S15), the ECU 5 proceeds to Step S17.

In Step S17, the ECU 5 determines whether or not the velocity v of the vehicle 2 is 0 km/h. In other words, the ECU 5 determines whether or not the vehicle 2 is stopped. When the vehicle 2 is stopped, the necessity for alarm is relatively low compared with when the vehicle 2 is running. Therefore, when it is determined that the velocity v of the vehicle 2 is 0 km/h (YES in Step S17), the ECU 5 proceeds to Step S16. As described above, in Step S16, the ECU 5 makes the display 42 display an alarm and ends the process. That is, when the TTC is equal to or less than 1 second (NO in Step S15), and the vehicle 2 is stopped (YES in Step S17), the ECU 5 does not activate the speaker 41 but activates the display 42 to raise an alarm to the driver of the vehicle 2.

On the other hand, when it is determined in Step S17 that the velocity v of the vehicle 2 is not 0 km/h (NO in Step S17), or in other words, when the vehicle 2 is not stopped, the ECU 5 proceeds to Step S18.

When the vehicle 2 is not stopped, the necessity for alarm is higher than when the vehicle 2 is stopped. In Step S18, the ECU 5 activates the display 42 to display an alarm and activates the speaker 41 to raise an alarm by producing an alarm or other sound in Step S19. That is, when the TTC is equal to or less than 1 second (NO in Step S15), and the vehicle 2 is not stopped (NO in Step S17), the ECU 5 activates the display 42 and the speaker 41 to raise more alarms to the driver of the vehicle 2.

When it is determined in Step S10 that the velocity v of the vehicle 2 does not fall within the predetermined range (NO in Step S10), when it is determined in Step S12 that there is no crossing object (NO in Step S12), or when it is determined in Step S14 that the TTC is not equal to or less than 2 seconds (NO in Step S14), the ECU 5 activates neither the display 42 nor the speaker 41 and ends the process.

[Effects and Advantages]

According to the first embodiment, when an object will cross any alarm line within a predetermined time, it can be determined that the object can collide with the vehicle 2, and an alarm can be raised. The alarm line setting part 51 sets the length of the alarm lines at different lengths between when the vehicle 2 is running in a straight line and when the vehicle 2 is turn left or right at the intersection 83 to enter the first lane 81 or the second lane 82. In this way, the alarm lines can be set according to the state of running of the vehicle 2, and the determination of collision can be made based on the alarm lines. As a result, alarms that are raised even though the possibility of an object colliding with the vehicle 2 is low can be reduced, or an alarm can be raised to alert the driver to an object that is approaching from the direction to which the driver tends to pay less attention.

When the vehicle 2 is to turn left at the intersection 83 to enter the first lane 81, the alarm line setting part 51 sets the alarm lines at L2, which is shorter than L1.

With this arrangement, when the vehicle 2 is to turn left at the intersection 83 to enter the first lane 81, the left alarm line 62 is set to be shorter than when the vehicle 2 is running in a straight line. As a result, even when the vehicle 2 temporarily comes closer to an object in the second lane 82 when the vehicle 2 is entering the first lane 81, a useless alarm based on the approach can be suppressed.

The alarm line setting part 51 sets the right alarm line 61, which is set for an object on the right side of the vehicle 2, and the left alarm line 62, which is set for an object on the left side of the vehicle 2 independently from the right alarm line 61. When the vehicle 2 is to turn right at the intersection to enter the second lane 82, the alarm line setting part 51 sets the length of the right alarm line 61 at L2. When the vehicle 2 is to turn left at the intersection 83 to enter the first lane 81, the alarm line setting part 51 sets the length of the left alarm line 62 at L2.

With this arrangement, the possibility of an object on the right side of the vehicle 2 colliding with the vehicle 2 and the possibility of an object on the left side of the vehicle 2 colliding with the vehicle 2 can be independently determined based on the right alarm line 61 and the left alarm line 62, respectively. As a result, the precision of the determination can be improved.

Furthermore, when the vehicle 2 is to turn right at the intersection 83 to enter the first lane 81 (provided that the traffic laws prescribe that vehicles run in the right lane, such as in the U.S.), the alarm line setting part 51 sets the length of the right alarm line 61 at L2. Furthermore, when the vehicle 2 is to turn left at the intersection 83 to enter the first lane 81 (provided that the traffic laws prescribe that vehicles run in the left lane, such as in Japan), the alarm line setting part 51 sets the length of the left alarm line 62 at L2. In this way, even when the vehicle 2 temporarily comes closer to an object in the second lane 82 when the vehicle 2 is entering the first lane 81, a useless alarm based on the approach can be suppressed.

In short, with this arrangement, both improvement of the precision of the determination and suppression of a useless alarm can be achieved.

When the vehicle 2 turns right at the intersection 83 to enter the first lane 81, the alarm line setting part 51 sets the length of the left alarm line 62 at L1 or L3. When the vehicle 2 turns left at the intersection 83 to enter the first lane 81, the alarm line setting part 51 sets the length of the right alarm line 61 at L1 or L3.

With this arrangement, the precision of determination of collision of an object on the side opposite to the direction in which the vehicle 2 is to travel can be improved. That is, with this arrangement, when the vehicle 2 is entering the first lane 81, an alarm concerning an object that is apt to escape attention of the driver can be raised with reliability while suppressing a useless alarm based on the vehicle 2 coming closer to an object in the second lane 82.

When the vehicle 2 is to turn left or right at the intersection 83 to enter the second lane 82, the alarm line setting part 51 sets the length of one of the alarm lines at L3, which is shorter than L1.

With this arrangement, the precision of the determination of collision of an object on the side opposite to the direction in which the vehicle 2 is to travel can be improved. That is, with this arrangement, when the vehicle 2 is entering the second lane 82, an alarm concerning an object that is apt to escape attention of the driver can be raised with reliability.

The left/right-turn determination part 56 determines that the vehicle 2 is turn left or right at the intersection 83 based on at least one of the turn signal switch 34 and the steering angle.

With this arrangement, it can be simply determined that the vehicle 2 is to turn left or right at an intersection.

Second Embodiment

Figure 8:
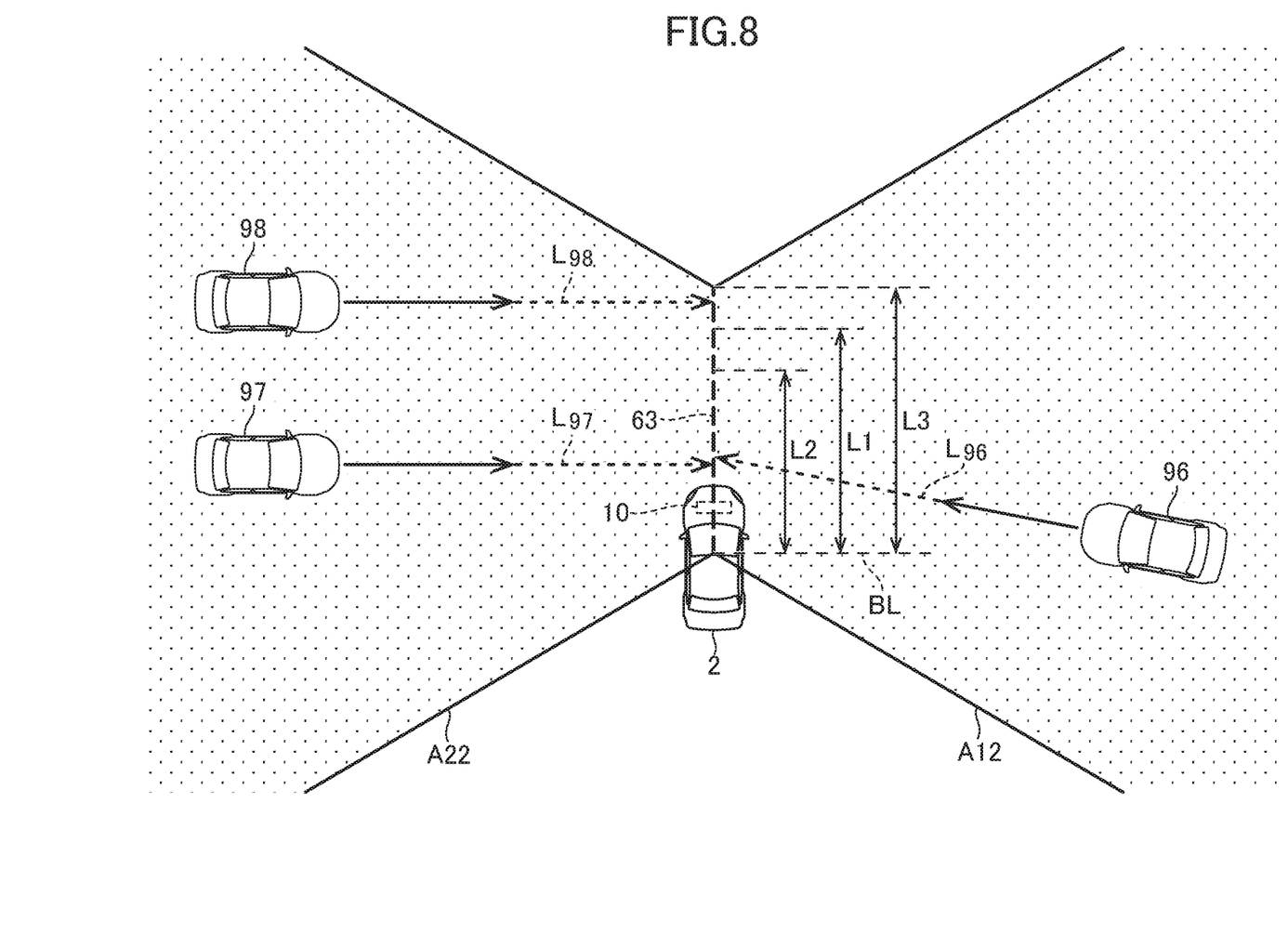
FIG. 8 is a diagram for illustrating determination of collision performed by an alarm system for a vehicle according to a second embodiment.
Figure 9:
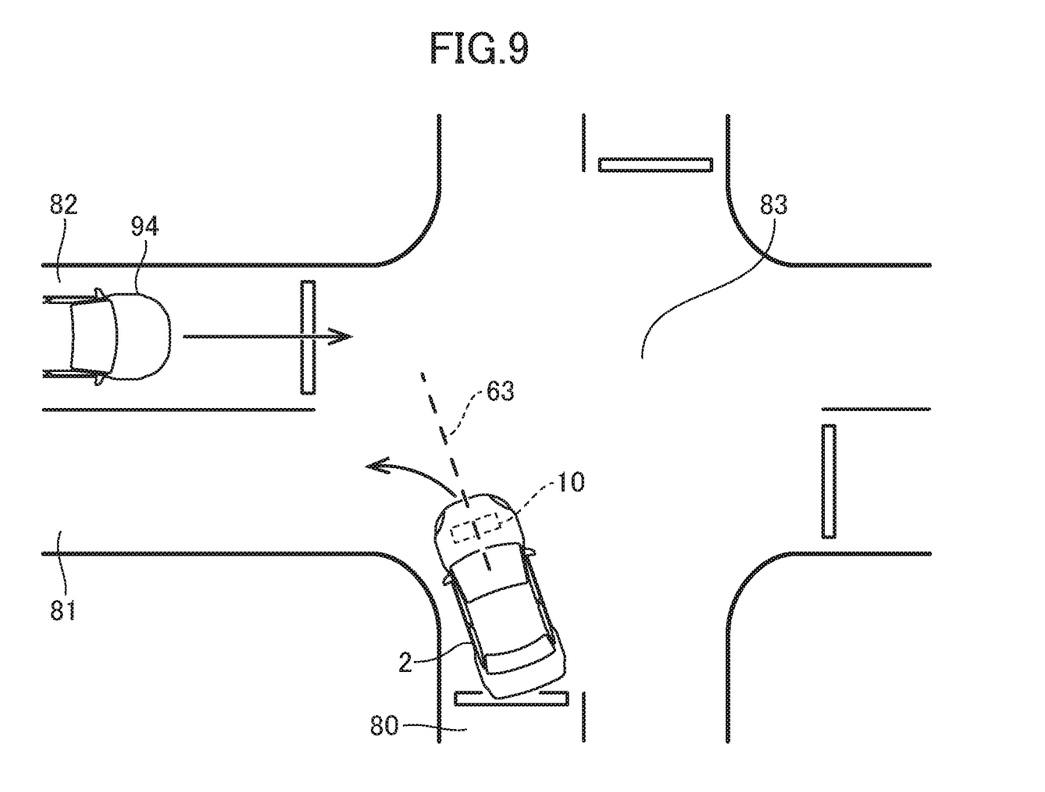
FIG. 9 is a diagram for illustrating determination of collision at the intersection.

Next, with reference to FIGS. 8 and 9, an alarm system 10 for a vehicle (referred to simply as an "alarm system 10", hereinafter.) according to a second embodiment will be described. FIG. 8 is a diagram for illustrating determination of collision by an alarm system 10, and FIG. 9 is a diagram for illustrating determination of collision at an intersection.

As with the alarm system 1 according to the first embodiment, the alarm system 10 according to the second embodiment is a system that raises an alarm to the driver of the vehicle to alert the driver. The alarm system 10 differs from the alarm system 1 according to the first embodiment in setting of the alarm lines and determination of collision. Of the components of the alarm system 10 and the controls performed by the alarm system 10, descriptions of those that are the same as those in the first embodiment will be omitted as appropriate.

As shown in FIG. 8, the alarm system 10 only sets a central alarm line 63. The central alarm line 63 substantially is set along the longitudinal center line of the vehicle 2. The central alarm line 63 extends straight in the longitudinal direction of the vehicle 2 from the base line BL.

When the vehicle 2 is stopped or running in a straight line, the alarm system 10 sets the length of the central alarm line 63 at L1 (7 m, for example). L1 is an example of the first length according to the present invention. The alarm system 10 can also set the length of the central alarm line 63 at a length different from L1. Specifically, as shown in FIG. 8, the alarm system 10 may set the length of the central alarm line 63 at L2 (5 m, for example), which is shorter than L1, or L3 (9 m, for example), which is longer than L1 (that is, L2<L1<L3). L2 is an example of the second length according to the present invention, and L3 is an example of the fourth length according to the present invention.

The alarm system 10 sets a detection region A12 on the right side of the central alarm line 63 and a detection region A22 on the left side of the central alarm line 63. The alarm system 10 detects an object in the detection region A12 or the detection region A22. When a virtual line $L_{96}$, $L_{97}$ or $L_{98}$ of another vehicle 96, 97 or 98 intersects with the central alarm line 63, the object detection part 52 obtains information about the vehicle 96, 97 or 98.

As with the alarm system 1 according to the first embodiment, the alarm system 10 calculates the TTC for the other vehicle 96, 97 or 98. Furthermore, based on the calculated TTC, the alarm system 10 determines whether or not the other vehicle 96, 97 or 98 will cross the central alarm line 63 within a predetermined time. Specifically, when the TTC is equal to or less than a predetermined threshold (2 seconds, for example), the alarm system 10 determines that the vehicle 96, 97 or 98 will cross the central alarm line 63 within the predetermined time (2 seconds, for example). In that case, the other vehicle 96, 97 or 98 can collide with the vehicle 2.

As shown in FIG. 9, when the vehicle 2 is to turn left at the intersection 83 to enter the first lane 81, the alarm system 10 changes the length of the central alarm line 63. That is, the alarm system 10 reduces the length of the central alarm line 63 compared with when the vehicle 2 crosses the intersection 83, and sets the length at L2 (see FIG. 8). As a result, even when the vehicle 2 temporarily comes closer to the other vehicle 94 in the second lane 82 when the vehicle 2 is entering the first lane 81, the virtual line in the direction of traveling of the other vehicle 94 is less likely to intersect with the central alarm line 63. As a result, the alarm system 10 is less likely to determine that the other vehicle 94 will cross the central alarm line 63, so that a useless alarm based on such an approach can be suppressed.

When the vehicle 2 is to turn right at the intersection 83 to enter the second lane 82 (not shown), the alarm system 10 sets the length of the central alarm line 63 at L3 (see FIG. 8). That is, the alarm system 10 increases the length of the central alarm line 63 compared with when the vehicle 2 crosses the intersection 83. As a result, when the vehicle 2 is entering the second lane 82, the virtual line in the direction of traveling of the other vehicle 94 is more easily intersect with the central alarm line 63. As a result, the precision of the determination of collision of the other vehicle 94 that is approaching from the left and is apt to escape attention of the driver can be improved.

REFERENCE SIGNS LIST

1, 10 alarm system for vehicle (alarm system)
2 vehicle
41 speaker (alarm device)
42 display (alarm device)
51 alarm line setting part
52 object detection part
53 collision determination part
54 alarm unit control part
56 left/right-turn determination part
61 right alarm line (alarm line)
62 left alarm line (alarm line)
63 central alarm line (alarm line)
81 first lane
82 second lane
83 intersection

What is claimed is:

1. An alarm system for a vehicle, comprising:
an alarm line setting part that sets an alarm line that extends forward from the vehicle;
an object detection part that detects an object on a side of the vehicle;
a collision determination part that determines whether or not the object crosses the alarm line within a predetermined time;
an alarm unit control part that activates an alarm unit when the collision determination part determines that the object crosses the alarm line within the predetermined time; and
a left/right-turn determination part that determines that the vehicle is to turn left or right at an intersection,
wherein, provided that, when the vehicle enters the intersection, of a plurality of lanes at the intersection that intersect with a lane in which the vehicle is running, a lane closer to the vehicle is defined as a first lane, and an opposing lane to the first lane that is further from the vehicle is defined as a second lane;
the alarm line setting part sets a length of the alarm line at a first length when the vehicle is running in a straight line;
the alarm line setting part sets the length of the alarm line at a length different from the first length when the vehicle is to turn left or right at the intersection to enter the first lane or the second lane;
the alarm line setting part sets the length of the alarm line at a second length shorter than the first length when the vehicle is to turn left or right at the intersection to enter the first lane;
the alarm line setting part sets, as the alarm line, a right alarm line for an object on a right side and a left alarm line that is set for an object on a left side independently from the right alarm line;
the alarm line setting part sets the length of the right alarm line at the second length when the vehicle is to turn right at the intersection to enter the first lane;
the alarm line setting part sets the length of the left alarm line at the second length when the vehicle is to turn left at the intersection to enter the first lane;
the alarm line setting part sets the length of the left alarm line in a longitudinal direction of the vehicle at a third length longer than the first length when the vehicle is to turn right at the intersection to enter the first lane; and
the alarm line setting part sets the length of the right alarm line in the longitudinal direction of the vehicle at the third length when the vehicle is to turn left at the intersection to enter the first lane.

2. The alarm system for a vehicle according to claim 1, wherein the left/right-turn determination part determines that the vehicle is to turn left or right at the intersection based on at least one of a turn signal switch and a steering angle.

3. An alarm system for a vehicle, comprising:
an alarm line setting part that sets an alarm line that extends forward from the vehicle;
an object detection part that detects an object on a side of the vehicle;
a collision determination part that determines whether or not the object crosses the alarm line within a predetermined time;
an alarm unit control part that activates an alarm unit when the collision determination part determines that the object crosses the alarm line within the predetermined time; and
a left/right-turn determination part that determines that the vehicle is to turn left or right at an intersection,
wherein, provided that, when the vehicle enters the intersection, of a plurality of lanes at the intersection that intersect with a lane in which the vehicle is running, a lane closer to the vehicle is defined as a first lane, and an opposing lane to the first lane that is further from the vehicle is defined as a second lane;
the alarm line setting part sets a length of the alarm line at a first length when the vehicle is running in a straight line;
the alarm line setting part sets the length of the alarm line at a length different from the first length when the vehicle is to turn left or right at the intersection to enter the first lane or the second lane; and
the alarm line setting part sets the length of the alarm line in a longitudinal direction of the vehicle to be longer than the first length when the vehicle is to turn left or right at the intersection to enter the second lane.

4. The alarm system for a vehicle according to claim 3, wherein the left/right-turn determination part determines that the vehicle is to turn left or right at the intersection based on at least one of a turn signal switch and a steering angle.

* * * * *